United States Patent [19]
Gallina

[11] 3,712,657
[45] Jan. 23, 1973

[54] SHOCK ABSORBING BUMPER FOR MOTOR VEHICLES

[76] Inventor: Joseph P. Gallina, 6852 Steadman, Dearborn, Mich. 48126

[22] Filed: June 8, 1971

[21] Appl. No.: 150,973

[52] U.S. Cl. .................................... 293/86, 293/65
[51] Int. Cl. ............................................ B60r 19/06
[58] Field of Search ........................... 293/65, 85, 86

[56] References Cited

UNITED STATES PATENTS

| 2,715,037 | 8/1955 | Maag | 293/85 |
| 2,229,491 | 1/1941 | Brooke | 293/65 |
| 1,739,930 | 12/1929 | Ungar | 293/86 |
| 2,792,250 | 5/1957 | Klingensmith et al. | 293/85 |

Primary Examiner—Gerald M. Forlenza
Assistant Examiner—Robert Saifer
Attorney—Adolph G. Martin

[57] ABSTRACT

A shock absorbing bumper for motor vehicles consisting of a transverse bar having thereon two laterally disposed rods slidably supported in a mounting bracket comprising a pair of oppositely disposed U shaped members. A coil spring on each of the two laterally disposed rods yieldably holds the transverse bar in an extended position. Such coil springs are adapted to compress so as to permit the transverse bar to retract whenever a force of pre-selected magnitude is exerted upon it.

1 Claim, 5 Drawing Figures

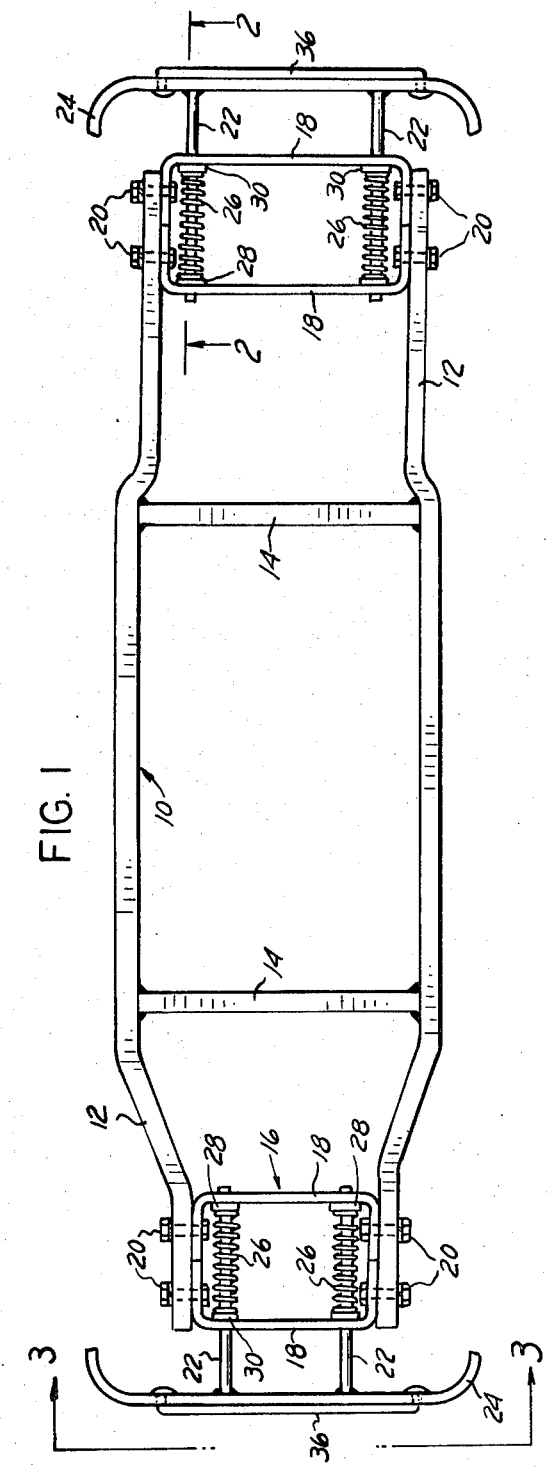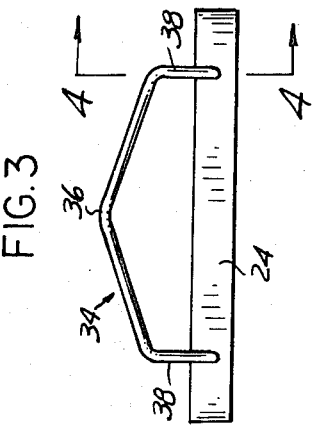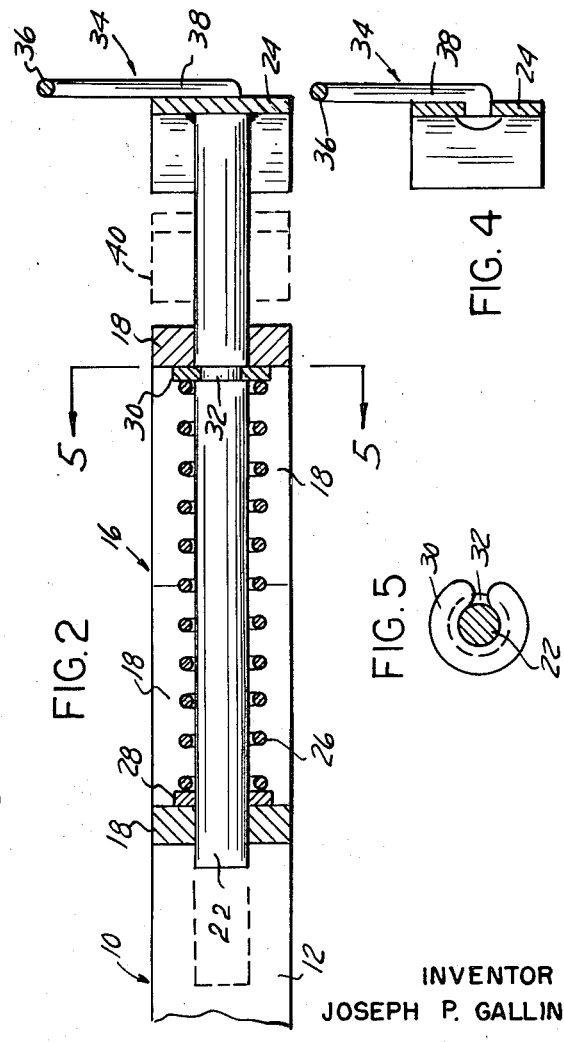
PATENTED JAN 23 1973
3,712,657
INVENTOR
JOSEPH P. GALLINA
BY Adolph G. Martin
ATTORNEY

3,712,657

SHOCK ABSORBING BUMPER FOR MOTOR VEHICLES

BACKGROUND OF THE INVENTION

This invention relates to vehicle bumpers generally, and more particularly to a type of shock absorbing bumper. Most vehicle bumpers presently in use are rigid in construction, and not designed to prevent a damaging force from being transmitted to the vehicle components. Such non-flexible bumpers deform readily upon impact, even at low speeds, thus permitting extensive damage to the vehicle, and severe shock and injury to its occupants. Fully cognizant of this shortcoming, the applicant has designed a bumper that will absorb a large portion of such impact force, so as to decrease substantially resultant damage to the vehicle, and significantly reduce the incidence of personal injury to its occupants.

SUMMARY OF THE INVENTION

This invention comprises a transverse bar 24 having fixed thereto a pair of laterally spaced rods 22 slidably supported in a mounting bracket 16. The mounting bracket 16 has two oppositely disposed U shaped members 18 attachable to longitudinal members 12 of a motor vehicle frame 10. A coil spring 26, on each of the laterally spaced rods 22, has the inner end thereof supported by one of the members 18 on the mounting bracket 16. A detachable retainer washer 30, on each of the laterally disposed rods 22, compresses the coil springs 26 sufficiently so that the yieldably hold the transverse bar 24 in an extended position.

BRIEF DESCRIPTION OF THE DRAWING

FIG. 1 is a top plan view of a motor vehicle frame 10 showing the bumper comprising the applicant's invention attached to the longitudinal members 12 of the frame 10.

FIG. 2 is an enlarged section view, taken substantially on plane 2—2 in FIG. 1, showing structural details of the invention.

FIG. 3 is a front elevation view, taken substantially on plane 3—3 in FIG. 1, showing the upstanding grille guard 34 on the transverse bar 24.

FIG. 4 is an enlarged section view, taken substantially on plane 4—4 in FIG. 3, showing attachment of the grille guard 34 to the transverse bar 24.

FIG. 5 is a section view, taken substantially on plane 5—5 in FIG. 2, showing the split retainer washer 30 and the annular groove 32 on the laterally spaced rods 22.

CONSTRUCTION

For a more detailed description of the invention, reference is made to the drawing in which numeral 10 designates a motor vehicle frame having a pair of longitudinal members 12 connected by cross supports 14. A mounting bracket 16, comprising two oppositely disposed U shaped members 18, is detachably connected to each end of the motor vehicle frame 10 by bolts 20. A pair of laterally spaced rods 22 are slidably supported in each of the mounting brackets 16.

A transverse bar 24 is attached to the outer ends of each pair of laterally spaced rods 22. A coil spring 26, on each of the laterally spaced rods 22, has the inner end thereof seated on a washer 28 supported by a U shaped member 18 of the mounting bracket 16. A split retainer washer 30 is detachably engaged in an annular groove 32 on the outer periphery of each laterally spaced rod 22.

The coil springs 26 are compressed sufficiently by the retainer washers 30 so as to hold the transverse bars 24 in their fully extended position, shown by the full lines in FIGS. 1 and 2. An upstanding grille guard 34, comprising an elongated rod 36 having downwardly disposed end portions 38, is welded, or otherwise suitably attached, to each of the transverse bars 24.

The preceding discussion completes a description of the structural details relating to the applicant's invention herein disclosed. However, to facilitate a more thorough and comprehensive understanding of the subject matter, a discussion is immediately hereinafter directed to the manner in which the device operates to accomplish its intended function.

In use, the applicant's bumper is attached to a motor vehicle frame 10 or chassis, as shown in FIG. 1, by means of the mounting bracket 16. The slightly compressed coil springs 26 hold the transverse bars 24 in their fully extended position, shown by the full lines in FIGS. 1 and 2. Whenever a force of predetermined magnitude is encoundered by the transverse bars 24, they transmit such force, through the laterally spaced rods 22 and the split retainer washers 30 to the coil springs 26, which are thereby compressed.

This compression of the coil springs 26, allows the transverse bars 24 to assume the broken line position 40 shown in FIG. 2. Such movement of the transverse bars 24 permit the impact shock of such a force to be partially absorbed by the coil springs 26 thus reducing physical damage to the vehicle, and the possibility of serious injury to its occupants.

In practice, it may become necessary to replace one of the coil springs 26 which has become broken or damaged. This replacement operation can be readily and expeditiously accomplished by first removing the split retainer washer 30 from each of the laterally spaced rods 22 on the damaged bumper. The laterally spaced rods 22 can then be withdrawn from the mounting bracket 16, and the damaged or broken coil spring 26 replaced.

The laterally spaced rods 22 are then reinserted into the mounting bracket 16, and the split retainer washer 30 again engaged in the annular groove 32 on the rods 22. This completes the re-assembly operation, and the applicant's bumper is again ready for use. The strength of the coil springs 26 selected for use in the applicant's shock absorbing bumper will depend in large measure upon the weight of the vehicle with which it is to be used.

Based upon the foregoing discussion, the applicant is of the opinion that his invention has fulfilled a long-felt need in the field of vehicle bumpers, and that he has accordingly made a valuable contribution to the related art. However, while the invention was described with reference to the structural details of a single embodiment, it will be appreciated by those familiar with the art that the principles involved are susceptible of numerous other practical adaptations.

I therefore claim as new, and desire to secure by letters patent:

1. A shock absorbing bumper for motor vehicles with a frame having a pair of longitudinal members, such bumper comprising a transverse bar having both an extended and a retracted position, two laterally spaced rods on the transverse bar, a coil spring on each of the laterally spaced rods yieldably holding the transverse bar in its extended position and permitting the transverse bar to move toward its retracted position when a force of pre-selected magnitude is exerted upon it, and a mounting bracket disposed between and attached directly to the two longitudinal members of the frame, such mounting bracket consisting of two U-shaped members which form a rectangular body, when viewed in a horizontal plane that encloses the coil springs, that slidably supports the laterally spaced rods against vertical displacement.

* * * * *